J. HEPP.

Improvement in Manufacture of Bird-Cages.

No. 5,116.

Reissued Oct. 29, 1872.

Witnesses.
C. Wahlers.
Ernst Bilhuber.

Inventor.
Julius Hepp
By Van Santvoord & Hauff
his attys

AM. PHOTO-LITHOGRAPHIC CO. N.Y. (OSBORNE'S PROCESS.)

UNITED STATES PATENT OFFICE.

JULIUS HEPP, OF NEW YORK, N. Y., ASSIGNOR TO O. LINDEMANN & CO., OF SAME PLACE.

IMPROVEMENT IN THE MANUFACTURE OF BIRD-CAGES.

Specification forming part of Letters Patent No. 124,576, dated March 12, 1872; reissue No. 5,116, dated October 29, 1872.

*To all whom it may concern:*

Be it known that I, JULIUS HEPP, of the city, county, and State of New York, have invented a new and useful Improvement in Bird-Cages; and I do hereby declare the following to be a full, clear, and exact description thereof, which will enable those skilled in the art to make and use the same, reference being had to the accompanying drawing forming part of this specification, in which drawing—

Figure 1:
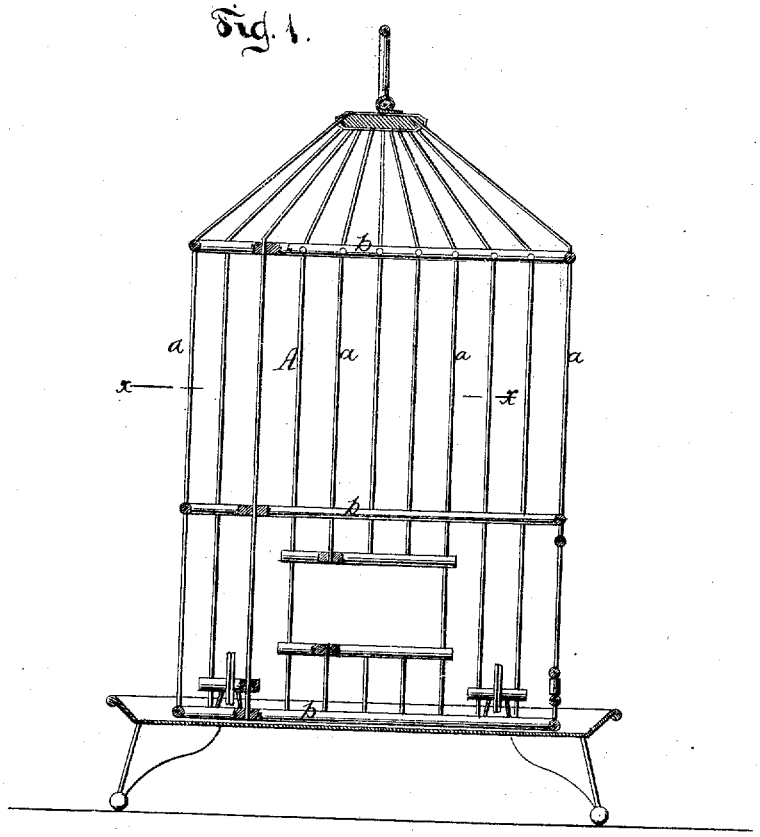
Figure 2:
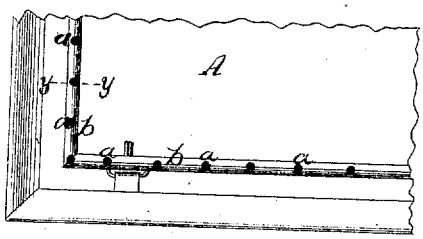
Figure 3:
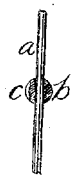

Figure 1 represents a vertical section of this invention; Fig. 2 is a horizontal section of the same; and Fig. 3 is a detached section of a cross-band or horizontal wire to illustrate how the vertical wire is secured thereto, (when the socket goes through the cross-band,) the plane of section being indicated by the line *y y*, Fig. 2.

Similar letters indicate corresponding parts.

This invention relates to a bird-cage, the upright wires of which are secured in the sockets of the cross-bands by simple pressure or friction, produced by compressing said cross-bands in such a manner that the operation of soldering the wires to the cross-bands can be dispensed with, and thereby much labor is saved, and, furthermore, the appearance of the cage is materially improved.

In the drawing, the letter A designates a bird-cage, which is constructed of wires *a* secured in cross-bands *b*. These cross-bands are made, by preference, of round bars provided with holes or sockets through which the wires *a* pass, the holes or sockets here shown being made centrally through the bars; but I do not restrict myself to any particular form of the bars, nor to any particular description of hole or socket, so long as the vertical wires *a* can be placed therein and be clamped by compressing the cross-bands. For the purpose of securing the wires in their sockets I press the side or sides of the socket against the vertical wire *a*, (see Fig. 3,) so that the wire *a* is firmly clamped in its socket. This can be accomplished in various ways, as, for instance, by a punch operated by a press, or it may be struck by a hammer, or a roller-punch may be used. The marks or compression not only serve to fasten the wires, but they also give to my cage a distinguishing appearance; and, if desired, the compressing instrument may be so made as to produce an ornamental impression, so as to increase the beauty of the cage.

The principal advantage of this mode of fastening the wires, however, consists in the fact that it enables me to secure said wires in the cross-bands and other bars running parallel therewith without solder, whereby much time is saved and the appearance of the cage is improved. Particularly in cages made of brass wires the presence of solder is very obnoxious, since such cages are usually exposed to the action of acid in order to render them bright, and all those spots which are covered by solder are turned black by the acid. It is necessary, therefore, in such cages, to remove all traces of solder before dipping the cage in the acid, and this operation requires much time and care; and, besides this, the operation of soldering the wires in their sockets itself requires much more time than the operation of securing the same by means of a punch or compression, as above described.

It is obvious that my improvement is applicable to round cages as well as to those of any other form or shape.

What I claim as new, and desire to secure by Letters Patent, is—

A bird-cage whose vertical wires *a* are fastened in the horizontal wires or bars by compressing the sides of the latter upon the vertical wires, substantially as described.

JULIUS HEPP

Witnesses:
W. HAUFF,
E. F. KASTENHUBER.